Jan. 7, 1958

J. S. BAER ET AL 2,819,020

CARD READER DEVICE

Filed Dec. 15, 1954

3 Sheets-Sheet 1

INVENTORS.
John S. Baer &
Robert A. Oberdorf
BY Morris L. Rabkin
ATTORNEY.

Jan. 7, 1958 J. S. BAER ET AL 2,819,020

CARD READER DEVICE

Filed Dec. 15, 1954 3 Sheets-Sheet 2

INVENTORS
John S. Baer &
Robert A. Oberdorf
BY Morris A. Rabkin
ATTORNEY

Jan. 7, 1958 J. S. BAER ET AL 2,819,020

CARD READER DEVICE

Filed Dec. 15, 1954 3 Sheets-Sheet 3

INVENTORS
John S. Baer &
Robert A. Oberdorf
BY Morris L. Rabkin
ATTORNEY

United States Patent Office 2,819,020
Patented Jan. 7, 1958

2,819,020

CARD READER DEVICE

John S. Baer, Woodbury, and Robert A. Oberdorf, Merchantville, N. J., assignors to Radio Corporation of America, a corporation of Delaware Application December 15, 1954, Serial No. 475,447

12 Claims. (Cl. 235—61.11)

This invention relates to perforation reading devices, and particularly to a device for reading information recorded on perforated cards.

Commercial institutions which have large volumes of business are increasingly using automatic means of processing data. For example, individual pieces of merchandise, such as garments, may be provided with individual, attached cards bearing information as to the nature of the merchandise. At the time of sale or change of status of the merchandise the card may be removed and the information on it read and recorded automatically for further handling, as in automatic accounting or other data processing machines.

Information recorded on such cards should be translated accurately and rapidly. Reading devices may be needed at a number of points in a business, so that any card reading device should also be economical to construct and operate. A card reader should be simple and compact in construction, and rugged and reliable in operation. Further, information is preferably densely packed on the small perforated cards.

Therefore, an object of this invention is to provide an improved perforation sensing mechanism which can operate on compactly recorded information.

Another object of this invention is to provide an improved perforation reading mechanism which is simpler, more compact, and more economical than the mechanisms of the prior art.

Another object of this invention is to provide an improved card reader for rapidly and reliably sensing perforation patterns recorded on small commercial cards.

A further object of this invention is to provide an improved card reader characterized by simplicity of operation and economy of construction for automatically reading information stored in the form of perforations on small commercial cards.

A card reading mechanism provided in accodrance with the invention reads the perforation patterns encoded on a commercial card and provides corresponding signal combinations as output. An operator may place a card to be sensed on a toothed slide. The slide is then stepped, under control of a rotary solenoid, so that the different perforation positions of a card are successively placed at a sensing position. In synchronism with each movement of the slide, actuating fingers controlled by the rotary solenoid force feelers against the card at the sensing position. Where the feelers detect a perforation, the actuating fingers close switches which provide the desired output signals. As the slide approaches the end of its travel, the card is stripped from the slide and fed onto a flipper mechanism. On the final step of the slide the flipper is actuated and the card is ejected. Also on the final step, the slide advancing mechanism is disengaged from the slide, the slide is returned to its starting position, and the rotary solenoid is shut off.

The novel features of the invention, as well as the invention itself, both as to its organization and method of operation, will best be understood from the following description, when read in connection with the accompanying drawings, in which like reference numerals refer to like parts, and in which.

Figure 1:
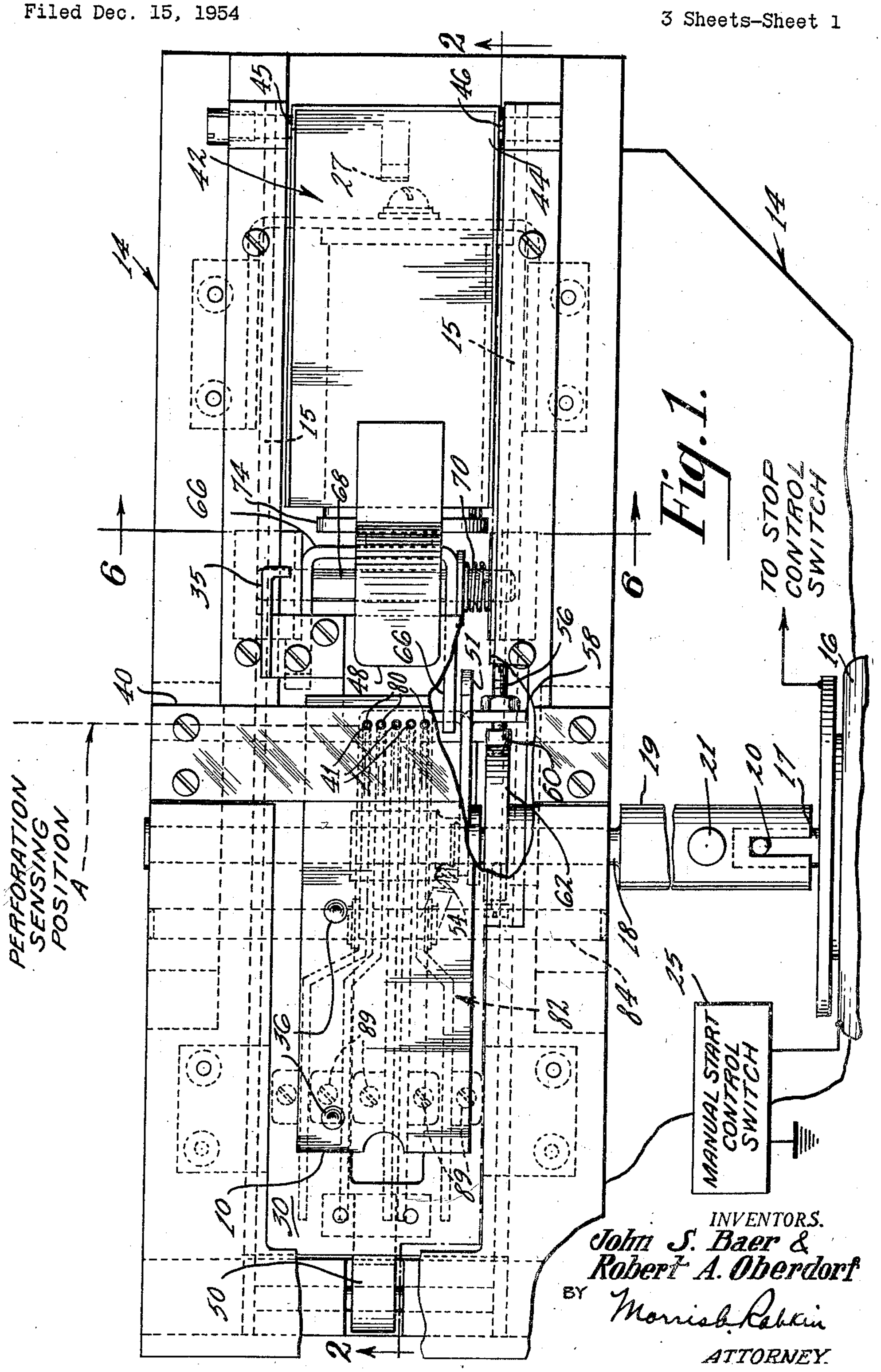
Fig. 1 is a plan view, partly in section, of a card reader device in accordance with the invention.
Figures 2, 3, 4:
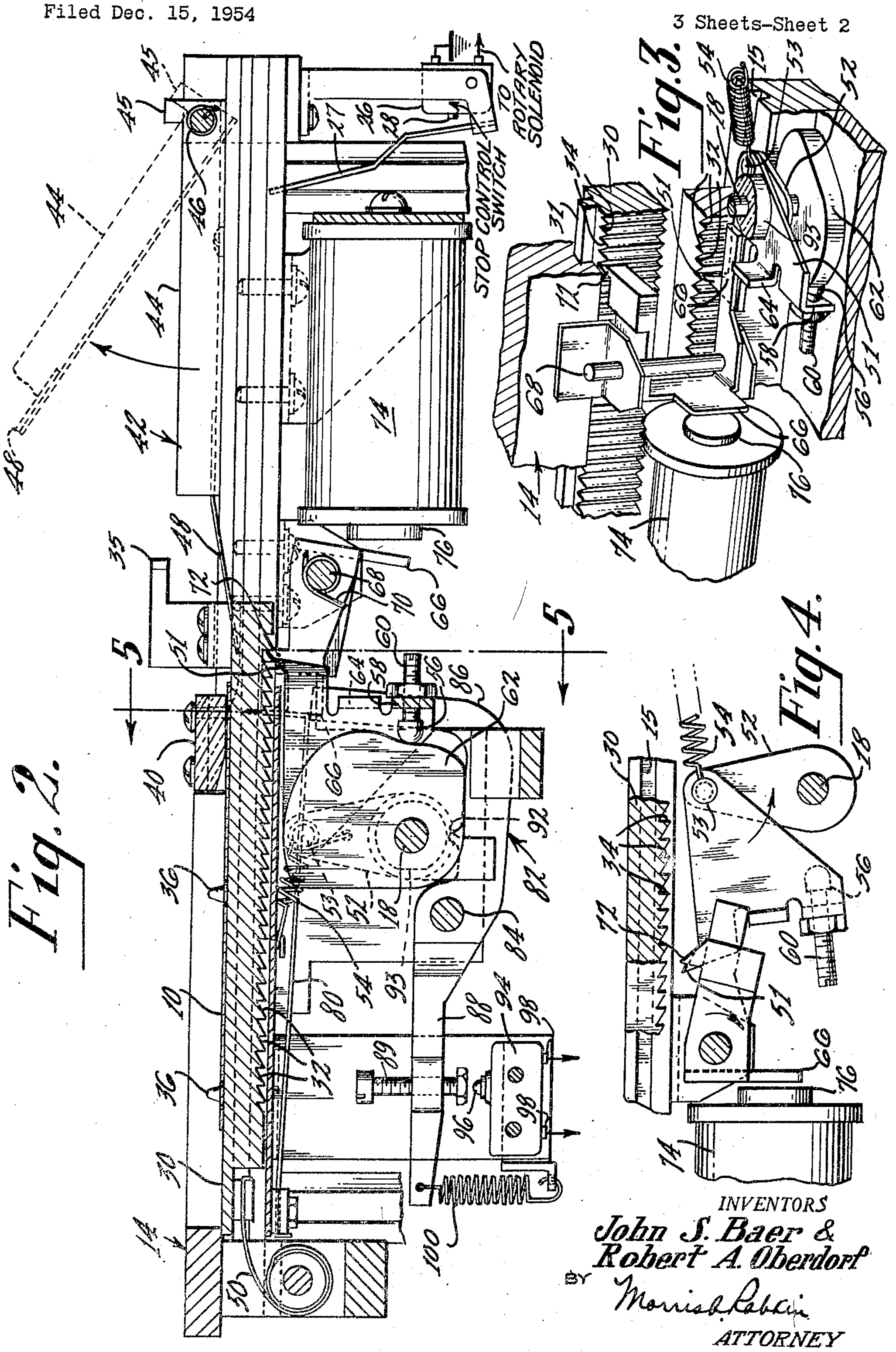
Fig. 2 is a front sectional view of the device, taken along the line 2—2 of Fig. 1, in the direction of the appended arrows.
Fig. 3 is a broken-away perspective view of the card advancing mechanism employed in the card reader device.
Fig. 4 is a broken-away section of a portion of the card advancing mechanism, showing the stepping and holding pawls disengaged from the card-holding slide, as viewed from the back of the mechanism.

The card reader mechanism (refer to Figs. 1 and 2) includes a base structure 14 to which moving members may be coupled or mounted. In a typical installation, a card or tag 10 may be placed on the top of the base structure 14 in the position shown in the front elevation of Fig. 2. For convenience, the description below assumes that the relationship of the various parts is as shown in Fig. 2. A card or tag, such as the illustrated tag 10, is on thte upper side of the base structure 14 and moves from the left side to the right side of the arrangement. The left side, as viewed in Figs. 1 and 2, is also referred to here as the tag entry side; the right side is also referred to as the tag exit side.

Motive power is supplied by a rotary solenoid 16 fixed to the base structure 14. The solenoid 16 is controlled by a manual start control switch 25 (Fig. 1) and a mechanically actuated stop control switch 26 (Fig. 2). The stop control switch 26, an associated switch arm 27, and an actuating button 28 are mounted on a support bracket 29 fixed to the base 14. When actuated, the rotary solenoid 16 turns from a start position through a given angle, here approximately 90°, and returns to the start position. The rotary solenoid 16, on starting, is energized and turns through the desired travel in the advance direction. Then it is temporarily de-energized and returns by spring action to the start position. The action is repeated automatically until a stop signal is provided.

The rotary solenoid 16 includes a shaft member 17. A central actuating shaft 18 is coupled through a coupling sleeve 19 to the rotary solenoid shaft 17. A pin 20 on the solenoid shaft 17 fits a slot in the coupling sleeve 19. The sleeve 19 is fixed to the central actuating shaft 18, which is rotatably mounted in the base structure 14 with its axis transverse to the direction of tag 10 movement. A snubber arm 21 is radially mounted in the coupling sleeve 19. A snubber block 22 is fixed to the base structure 14 in the line of movement of the snubber arm 21. A resilient pad 23 is provided on the snubber block 22 for contact with the snubber arm 21. A spring 24 couples the snubber arm 21 to the snubber block 22, biasing the solenoid 16 and coupled mechanism toward a start position.

Figures 5, 6, 7:
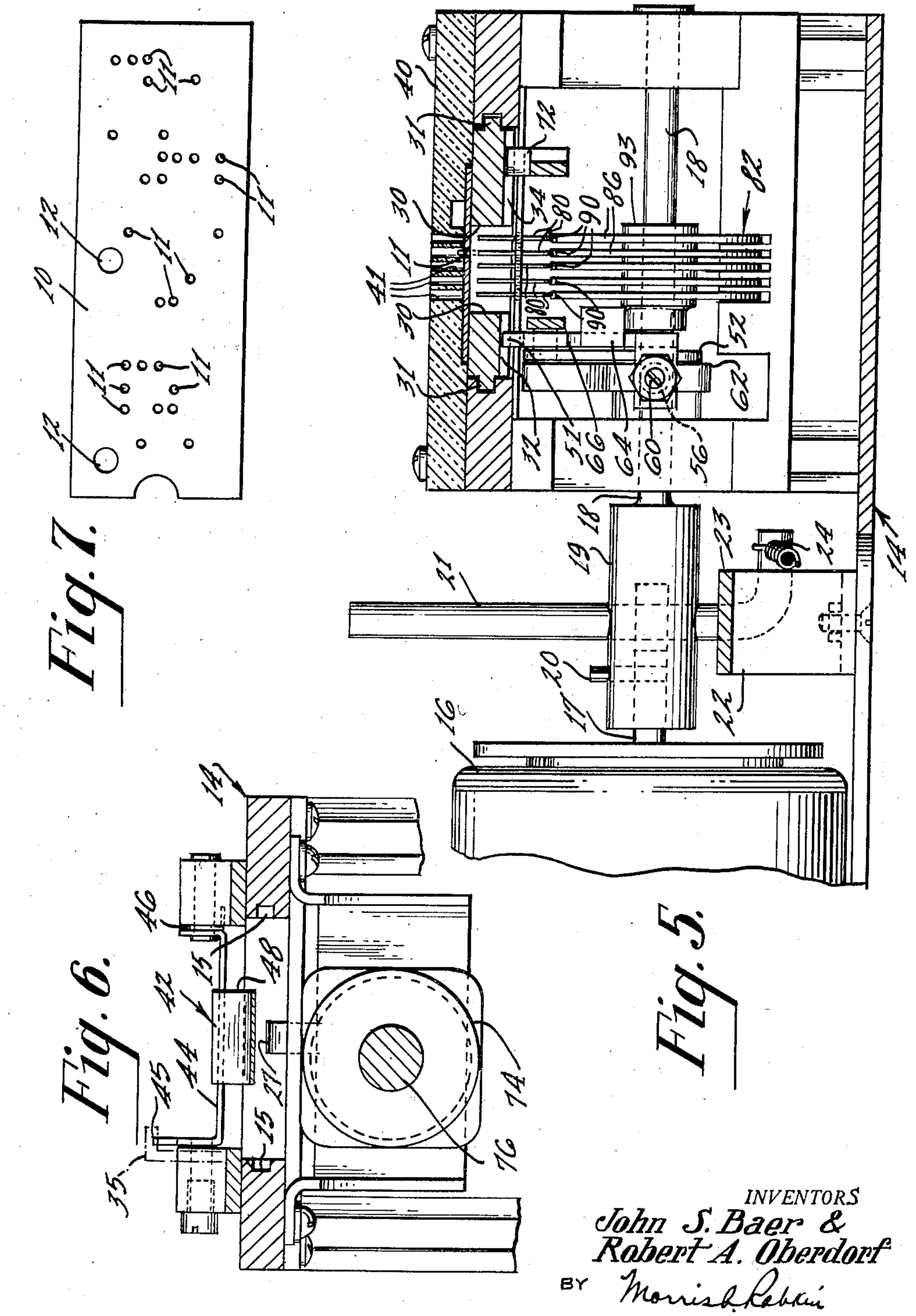
Fig. 5 is an end sectional view of the card reader device, taken along the line 5—5 of Fig. 2, in the direction of the appended arrows.
Fig. 6 is an end sectional view of the card reader device, taken along the line 6—6 of Fig. 1, in the direction of the appended arrows.
Fig. 7 is a plan view of a type of card, such as a small garment tag, which may be read by the illustrated card reader device.

A tag holding slide 30 (refer also to Figs. 3 and 5) is mounted in the upper surface of the base structure 14 so as to move in the base structure 14 from left to right. The slide 30 moves within parallel guide surfaces in the base 14. Each guide surface includes a groove portion or surface 15 opposing the slide 30. Parallel tongue portions 31 on each side of the slide 30 mate with the groove surfaces 15 in the base structure 14. The slide 30 includes a flat upper surface and a central aperture sufficient to encompass the perforation positions on a tag 10.

On the bottoms the slide 30 (refer particularly to Fig. 3) are two rows of teeth 32 and 34 extending along the slide 30 parallel to the direction of slide 30 movement. A first of these rows (the nearest row in the front elevation) comprises a row of stepping teeth 32. A second of the rows (the furthest row in the front elevation) comprise a plurality of holding teeth 34. The central aperture in the slide 30 is between the rows 32 and 34 of teeth, and provides a space through which perforations in a tag 10 may be sensed. The aperture in the slide 30 encompasses the possible perforation positions on a tag 10.

Two positioning studs 36, for holding tags 10 which are to be sensed, are mounted on the top side of the slide 30. The positioning studs 36 are so placed that large positioning perforations 12 (refer to Fig. 7) in each tag 10 fit the studs 36. When so located, information perforations 12 in each tag 10 are over the central aperture in the tag holding slide 30 (see Fig. 1). A tag 10 is positioned, in this example, on the studs 36 by an operator. An ejector control arm 35 (see Figs. 1 and 2) is mounted on the top of the slide 30 at the tag exit side.

As tags 10 are moved from the tag entry to the tag exit side they pass a perforation sensing position (marked by the line A in Fig. 1). Perforation sensing position A is represented as a line transverse to the direction of movement of tags 10. Sensing is actually accomplished, however, at a number of sensing points defined here as the different points at which the separate rows of information perforations 11 on the tags 10 pass the perforation sensing position A. The tags 10 pass (here see Figs. 1, 2, and 5) between the base structure 14 and a tag guide bar 40 attached to the base 14 and extending laterally across the path of the tag 10 at the tag sensing position A. The spacing between the slide 30 and the guide bar 40 provides a wide entry portion for receiving the tag 10. At the sensing position A, however, the guide bar 40 is closely spaced to the slide 30 and contains a tag 10 on the slide 30 against upward movement. The guide bar 40 includes a receiving hole 41 at each perforation position. A tag 10 on the slide 30 is not gripped between the slide 30 and the guide bar 40.

A flipper mechanism 42 (see Figs. 1, 2, and 6) comprising a channel member 44 is pivotally mounted at the tag exit side of the base structure 14. A spring 46 coupling the channel member 44 to the base 14 tends to hold the channel member 44 against the base 14 at a point between the perforation sensing position A and the tag exit side of the base 14. A stripper bar 48 attached to the free end of the channel member 44 normally engages the base 14. The stripper bar 48 extends under the leading edge of a tag 10 as the tag 10 moves past the sensing position A toward the tag exit side. The channel member 44 includes side members which restrain a tag 10 from lateral movement, and an ejector tab 45 at the tag exit side of one of the side members. When the slide 30 is at the tag exit end of the base structure 14 the slide ejector control arm 35 engages the ejector tab 45 on the channel member 44. The final movements of the slide 30 toward the tag exit end pivot the channel member 44 in a clockwise direction, as seen in Fig. 2.

A spiral reel spring 50 (see Figs. 1 and 2) is mounted on the tag entry side of the base structure 14 and attached to the slide 30. The spiral reel spring 50 biases the slide 30 toward the tag entry side of the base 14 but permits the slide 30 to be moved toward the tag exit side of the base 14. If the slide 30 is released, however, the spiral reel spring 50 draws the slide 30 back to the tag entry side.

The tag advancing mechanism is mounted on the base structure 14 below the tag holding slide 30 (see particularly Figs. 2, 3, and 4). A stepping pawl 51 cooperates with the stepping teeth 32 on the tag holding slide 30. The stepping pawl 51 is coupled to a pivot arm 52 through a pivot pin 53. The pivot arm 52 is rotatably mounted on the central actuating shaft 18. The stepping pawl 51 is biased toward the tag entry side by a spring 54 coupling the pivot pin 53 to the base structure 14. A tab 58 on the stepping pawl 51 provides support for a cam follower 56. A set screw 60 permits the cam follower 56 to be adjusted and held as desired with relation to the stepping pawl 52.

The cam follower 56 mounted on the stepping pawl 51 is biased by the spring 54 to ride on a stepping control cam 62 mounted on the central actuating shaft 18. The stepping pawl 51 also includes an integral release tab 64 (best seen in Fig. 3). The stepping pawl 51 may be disengaged from the stepping teeth 32 by a return control bracket 66 which is engageable with the release tab 64 on the stepping pawl 51. The return control bracket 66 turns about a shaft 68 and is normally biased toward the slide 30 and out of engagement with the release tab 64 by a coupled spring 70 engaged to the base structure 14.

A return control solenoid 74 mounted on the base structure 14 has a magnetizable core 76 adjacent to the return control bracket 66. When the return control solenoid 74 is energized, the return control bracket 66 pivots (see Fig. 4 particularly) toward the magnetizable core 76. When the return control bracket 66 is thus pivoted, it engages the release tab 64 on the stepping pawl 51, and disengages the stepping pawl 51 from the stepping teeth on the slide 30.

The return control bracket 66 includes an integral pawl 72, which may be termed a holding pawl, engaging the holding teeth 34 on the slide 30 (see Fig. 3 particularly). The holding pawl 72 prevents movement of the slide 30 toward the tag entry end, unless the holding pawl 72 is moved out of engagement with the holding teeth 34 on the slide 30.

The mechanism for sensing tag perforations includes a number of elongated feeler members 80 (refer here to Figs. 2 and 5) mounted in the base structure 14. Each of the feeler members 80 may contact a different one of the sensing points at the perforation sensing position A and register with a receiving hole 41 in the guide bar 40. The feeler members 80 may be of resilient material and so mounted in the base 14 as to tend to maintain a space between themselves and their respective sensing points. The feeler members 80 are so shaped as to provide terminal sensing pins moving substantially normal to the tag 10 when the feeler members 80 are moved upward toward a tag 10.

A group of actuating fingers 82 (see Fig. 2 particularly) are employed to move the feeler members 80 to the sensing points. The actuating fingers 82 pivot about a shaft 84 mounted in the base structure 14 parallel to the central actuating shaft 18. Each actuating finger 82 includes a right-angled arm 86 (as seen in Fig. 2) extending off one side of the shaft 84 toward the tag entry side, and a lever arm 88 extending off the other side of the shaft 84 toward the tag entry side of the mechanism. The actuating fingers 82 include engaging tips 90, each contacting a different one of the feeler members 80. Adjustable switch contacts 89 are mounted in each of the lever arms 88. An integral cam follower surface 92 within each of the right-angled arms 86 on the actuating fingers 82 engages a sensing control cam 93 on the central actuating shaft 18.

Small electro-mechanical switches 94 are mounted on the base structure 14 adjacent the lever arm portions 88 of the actuating fingers 82. Each of these small electro-mechanical switches 94, hereafter called output switches, includes an actuating button 96 which, when pressed, closes the switch 94. Terminals 98 from each output switch 94 may be coupled to a signal utilization device (not shown).

The spacing between the output switches 94 is greater than the spacing between the feeler members 80. The actuating fingers 82 are therefore so shaped as to register with both the output switches 94 on one end and the feeler members 80 on the other. Individual springs 100 couple the ends of the lever arms 88 of each of the actuating fingers 82 to the base structure 14. These springs 100 bias the engaging tips 90 of the actuating fingers 82 toward the feeler members 80 and also maintain the integral cam follower surfaces 92 in contact with the sensing control cam 93.

The card or tag 10 used to illustrate the operation of the invention (refer to Fig. 7) may have five information perforation 11 rows extending along its length. Individual characters may be represented by the individual information perforation 11 columns extending across the tag 10. Thus in Figs. 1 and 5, five feeler members 80, five actuating fingers 82, and five output switches 94 are shown by way of example. Greater or lesser numbers of these units may, however, be employed if so desired.

In operation (refer to Figs. 1 and 2), an operator may place on the slide 30 a tag 10 which is to be sensed. The large positioning perforations 12 on the tag 10 fit the positioning studs 36 on the slide 30. A sensing operation starts with the slide 30 at the tag entry side of the mechanism. Mechanical movement is begun by manual actuation of the start control switch 25, which starts the rotary solenoid 16.

On receiving a start signal, the rotary solenoid 16 provides, as described above, repeated angular movements from and back to a start position. The rotary solenoid 16 moves when starting in a clockwise direction, as viewed in Fig. 1, and returns in a counter-clockwise direction. The movements are uniformly limited by the resilient pad 23 (see Fig. 5) on the snubber block 22. The pad 23 limits the motion of the snubber arm 21. The coupling spring 24 aids the return motion of the solenoid 16. Each movement of the rotary solenoid 16 results in advancing and sensing motions so coordinated as to provide sensing of the successive columns on the tag 10. All information perforation positions 11 in any one column across the tag 10 are sensed simultaneously.

The movement of the central actuating shaft 18 also rotates the cams 62, 93 mounted on the shaft 26. The stepping control cam 62 provides a surface contour of increasing radius followed by a surface of substantially constant radius to the cam follower 56 on the stepping pawl 51 during this movement. Through the bias of the spring 54 the stepping pawl 51 cam follower 56 rides on the surface of the stepping control cam 62. The stepping pawl 51 pivots about pivot pin 53 at the end of the pivot arm 52 and moves linearly with the cam follower 56. As the cam follower 56, following the stepping control cam 62 surface, moves away from the central actuating shaft 18 the tooth engaging tip of the stepping pawl 51 moves toward the tag exit end of the mechanism. The stepping pawl 51 engages one of the stepping teeth 32 (see also Fig. 3) and advances the slide 30 one tooth pitch toward the tag exit side. As the slide 30 is advanced the holding pawl 72 on the return control bracket 66 rides over the crest of a holding tooth 34 and engages the next holding tooth 34. Thus the slide 30 is stepped one position toward the tag exit side and is held at that position.

When the rotary solenoid 22 approaches the limit of its clockwise movement the cam follower 56 mounted on the stepping pawl 51 rides on the contour of substantially constant radius on the stepping control cam 56. Therefore the stepping pawl 51 remains momentarily at the limit of its advancing motion. During this pause the sensing action takes place. The sensing movement is generated from the contour surface provided by the sensing control cam 93 to the integral cam follower surfaces 92 on the actuating fingers 82. At equivalent angular positions of the central actuating shaft 18, taken relative to the associated cam followers, the sensing control cam 93 is substantially constant in radius where the stepping control cam 62 increases in radius. Where the stepping control cam 62 radius remains substantially constant, near the limit of the angular movement, the sensing control cam 93 decreases in radius.

The integral cam follower surfaces 92 on the actuating fingers 82 are biased by the springs 100 to ride against the sensing control cam 93. Near the limit of the rotary solenoid 16 advance movement these cam follower surfaces 92 are in contact with the contour of small radius on the sensing control cam 93. At the same position of the central actuating shaft 18, the stepping pawl 51 is momentarily stationary at the limit of its movement toward the tag exit side. The actuating fingers 82 therefore rotate counter-clockwise (as viewed in Fig. 1) and the lever arms 88 move toward the output switches 94. The engaging tips 90 on the actuating fingers 82 move the feeler members 80 toward the tag 10 at the perforation sensing position A through the central aperture in the slide 30.

The travel of the actuating fingers 82 and feeler members 80 is sufficient for the feeler members 80 (here see Fig. 5 particularly) to enter information perforations 11 in the tag 10. Feeler members 80 which are moved against unperforated positions are stopped by the tag 10. The tag guide bar 40 stiffens the tag 10 against the force of the feeler members 80. As the feeler members 80 move toward the sensing points the adjustable output switch contacts 89 (see Fig. 2) on the actuating fingers 82 move toward the associated output switch 94 actuating buttons 96. Only where feeler members 80 enter information perforations 11 in a tag 10, however, do the actuating fingers 82 complete a full motion. Only these feeler members 80, therefore, permit the responsive output switch contacts 89 to engage the actuating buttons 96 and close the output switches 94. Thus the output switches 94 are closed wherever a perforation exists and open where a perforation has not been provided in the column being sensed. A code signal combination may therefore be provided at the terminals 98 of the output switches 94 to a signal utilization device (not shown).

Thus an advancing and sensing motion is completed. The rotary solenoid 16 begins a return motion, turning the central actuating shaft 18 and the cams 62, 93 on the shaft 18 to the start position. The cam followers 56 and 92 which ride on the cams 62 and 93, respectively, thus follow the same contours as in the advance movement, but in the reverse direction. Therefore, the cam follower 56 on the stepping pawl 51 returns to the starting contour surface, of small radius, on the stepping control cam 62. The stepping pawl 51 moves back toward the tag entry side of the mechanism and engages the next stepping tooth 32 on the slide 30 in preparation for another advancing motion. During this return movement, the holding pawl 72 (see Fig. 3) engages a holding tooth 34 and prevents the slide 30 from being drawn to the tag entry side by the spiral reel spring 50 (see Figs. 1 and 2). During the return movement also, the sensing control cam 93 returns to its original position, and the feeler members 80 withdraw from the tag 10.

The rotary solenoid 16 continues operating and the advancing and sensing operations are repeated. With each advance of the slide 30 another column of information perforations 11 on the tag 10 is placed at sensing position A. The slide 30 and the tag 10 move from the tag entry side to the tag exit side of the mechanism. The leading edge of the tag 10 passes over the free end of the stripper bar 48 (see Fig. 6 also) attached to the channel member 44. As the tag 10 is advanced toward the tag exit side of the mechanism, the tag 10 is spread away from the positioning studs 36 and moved between the sides of the channel member 44 in the flipper mechanism 42. A tag 10 is fully sensed when all information perforation columns have passed the sensing position A. The slide 30, however, is adavnced to the extent of its travel toward the tag exit side. Erroneous signals are not provided because no perforations are sense after the last information perforation column has passed the sensing position A.

When the slide 30 reaches the tag exit side the tag 10 is free of the tag guide bar 40 and supported on the channel member 44 of the flipper mechanism 42. The last advancing motions of the slide 30 place the ejector control arm 35 in contact with the ejector tab 45 on the channel member 44. The arm 35 pivots the channel member 44 clockwise (as seen in Fig. 2). The channel member 44 pivots toward the vertical, permitting the tag 10 on the channel member 44 to slide down the channel member 44, ejected from the mechanism.

On reaching the tag exit side of the mechanism, the slide 30 also (see Fig. 2) engages the stop control switch arm 27. The arm 27 contacts the actuating button 28 of the stop control switch 26 for the rotary solenoid 16, shutting off the rotary solenoid 16. The stop control switch 26 also actuates the return control solenoid 74. The magnetizable core 76 of the return control solenoid 74 attracts the adjacent control bracket 66 (see also Fig. 4). The return control bracket 66 pivots (counter-clockwise as viewed in Fig. 2 or clockwise as viewed in Fig. 4) toward the core 76. The holding pawl 72 on the return control bracket 66 is therefore disengaged from the holding teeth 34 on the slide 30. The return control bracket 66 also engages the release tab 64 on the stepping pawl 52. The same movement which disengages the holding pawl 72 disengages the stepping pawl 51 from the associated stepping teeth 32 on the slide 30. Therefore, the slide is fully disengaged (as in Fig. 4) and is drawn back to the tag entry end of the mechanism by the spiral reel spring 50. The return movement of the slide 30 permits the channel member 44 to pivot back toward the base structure 14. After a time delay sufficient to permit return of the slide 30 to the tag entry side, the return control solenoid 74 is de-energized. The elements of the mechanism are therefore once again in their starting condition and a new tag may be entered and a new reading operation begun.

Thus there has been provided a simple and reliable mechanism for sensing perforated cards. The information to be sensed may be compactly stored . The mechanism operates reliably and rapidly while at the same time being compact and rugged. The mechanism is characterized by ease of operation and economy of construction. If desired, the mechanism may operate with an information handling system which controls the application of stop signals and the manner in which a card is read.

What is claimed is:

1. A card reader mechanism comprising driving means adapted to be connected to a source of rotary motion, card holding means, means coupled to said driving means for advancing said card holding means incrementally from a start position, means coupled to said driving means for sensing a card in synchronism with the operation of said advancing means, means responsive to the position of said card holding means for removing a card from said card holding means, and means responsive to the position of said card holding means for returning said card holding means to its start position.

2. A perforated card reader mechanism comprising rotatable driving means adapted to be connected to a source of rotational motion, card holding means, means responsive to said driving means for advancing said card holding means incrementally in a plane from a start position, means including a plurality of feeler members responsive to said driving means for sensing a card in synchronism with the operation of said advancing means, output switch means responsive to said sensing means, means responsive to the position of said card holding means for removing said card from said card holding means, and means responsive to the position of said card holding means for returning said card holding means to its start position.

3. A perforated card reader mechanism comprising a drive member, means for providing said drive member with angular advance and return motions of predetermined amplitude from and to a start position, means including a toothed slide for holding said card, means including pawl members responsive to said drive member for advancing said card holding means by said toothed slide in increments from a start position, a plurality of feeler members normally spaced apart from the path of movement of a card on said card holding means, means including a plurality of actuating fingers responsive to said angular motion providing means for entering said feeler members into perforations in a card to be sensed in synchronism with said means for advancing, output switch means responsive to the position of said actuating fingers, means responsive to the position of said card holding means for removing said card from said card holding means, and means responsive to the position of said card holding means for returning said card holding means to its start position.

4. A perforated card reader mechanism comprising a drive member, means for providing angular advance and return motions of predetermined amplitude to said drive member, cam means coupled to said drive member, a slide for holding a card to be sensed, said slide being movable in advance and return directions in the plane of said angular motions, said slide having toothed surfaces thereon and including an aperture encompassing perforation positions of a card to be sensed, stepping pawl means responsive to said cam means and normally operatively engaging said toothed slide surfaces to provide incremental advancing movements to said card holding slide, holding pawl means normally operatively engaging said toothed slide surfaces, resilient feeler member means normally spaced from a card to be sensed on said slide, actuating finger means responsive to said cam means and engaging said feeler members to enter said feeler members into perforations in said card through said aperture in said slide, output signalling means including switch means responsive to the position of said actuating fingers, return control means responsive to the position of said slide for disengaging said pawls from said toothed slide surfaces, means mounted in fixed relation to said angular motion providing means for providing a return movement to said slide when said pawls are disengaged, and means in fixed relation to said angular motion providing means and responsive to the position of said slide for disengaging a card on said slide from said slide.

5. A mechanism for sensing perforation combinations encoded in columns and rows of perforations on a record card, said mechanism comprising a base structure, a card holding slide including means for positioning a card to be sensed, said card holding slide being movable from a starting position in said base structure in the plane of a card to be sensed and in the direction of the rows of perforations on said card, said slide including toothed holding surfaces and toothed stepping surfaces parallel to the direction of movement and having a central aperture therein encompassing perforation positions on a tag to be sensed, signal controlled rotary solenoid means for providing incremental angular advance and return movements, a central actuating shaft rotatably mounted in said base structure transverse to the direction of movement of said slide and parallel to the plane of said card to be sensed and coupled to said rotary solenoid, a stepping control cam mounted on said actuating shaft, a sensing control cam mounted on said actuating shaft, a stepping pawl pivotally mounted on said actuating shaft and including a cam follower member and a release tab, means biasing said stepping pawl to operative engagement with the toothed stepping surfaces on said slide and said cam follower member to operative engagement with said stepping control cam, a holding pawl including a release tab engaging member and pivotally mounted in said base structure, means biasing said holding pawl to operative engagement with the toothed holding surfaces on said slide and said release tab engaging members out of engagement with said release tab, a spiral reel spring coupling said base structure and said slide and biasing said slide toward said starting position, signal providing means coupled to said rotary solenoid and responsive to the position of said slide, a return control solenoid responsive to said signal providing means and mounted in said base structure to pivot said holding pawl out of engagement with said toothed holding surface as said release tab engaging member of said holding pawl disengages said stepping pawl from said toothed stepping surfaces, a plurality of resilient feeler members mounted in said base structure for sensing the perforation positions in a column of said card, said feeler members tending to be spaced away from said card, a plurality of actuating fingers pivotally mounted in said base structure, each of said fingers pivoting in a different plane normal to the plane of said card and comprising two levers extending in fixed relation from the pivot point, a first of said levers engaging one of said feeler members and including a cam follower member in operative relation to said sensing control cam, a plurality of biasing means, each coupling the second lever of one of said fingers to said base structure to hold the cam follower member on said first lever against said sensing control cam and in engagement with the associated feeler member, a plurality of output switches each responsive to the position of the second arm of a different one of said actuating fingers, and a stripping mechanism pivotally mounted in said base structure to pivot a card on said slide away from said slide responsive to the position of said slide.

6. In a perforated record sensing mechanism which advances a perforated record in incremental timed steps past a sensing position, a sensing mechanism comprising a plurality of feeler members mounted in said mechanism and normally resiliently spaced apart from said sensing position, a plurality of actuating fingers pivotally mounted in said mechanism, said fingers being movable responsive to the advancing record movements and moving synchronously therewith, each of said fingers registering with a different one of said feeler members to move said feeler member through a perforation of said perforated record at said sensing position, and means responsive to the position of said actuating fingers to provide output signals.

7. In a card reader mechanism which advances a perforated card in incremental timed steps past a sensing position, a sensing mechanism comprising a plurality of elongated resilient feeler members, each of said feeler members having a sensing tip and being mounted in said mechanism to be spaced from said sensing position when not engaged by an external member, a plurality of actuating fingers pivotally mounted in said mechanism, sensing control cam means in operative relation to said actuating fingers and responsive to the advancing step movements of the perforated card, a plurality of biasing means, each coupling a different one of said actuating fingers to said mechanism, and biasing said finger to engagement with said sensing control cam means, each of said fingers registering with a different one of said feeler members to move said sensing tips through perforations of said perforated card at said sensing position, each biasing means overcoming the resiliency of a feeler member sufficiently to enter the sensing tip in a perforation but not to penetrate an unperforated position, and a plurality of switches, each responsive to the position of a different one of said actuating fingers.

8. A mechanism for reading a perforated record medium in successive steps comprising a shaft, means for providing an incremental rotary motion to said shaft, cam control means coupled to said shaft, means including toothed elements, movable normal to said shaft, for holding said record medium, means responsive to said cam control means to advance said record medium holding means by said toothed elements, means responsive to the position of said card holding means for disengaging said advancing means from said toothed elements, and means including feeler members responsive to said cam control means for sensing said record medium for perforations.

9. A mechanism for reading a perforated record medium in successive steps comprising a central actuating shaft, means for providing an incremental rotary motion and a return motion to said shaft, sensing cam means on said shaft, advancing cam means on said shaft, perforated record medium holding means including a plurality of toothed elements for moving a record medium perpendicularly to the axis of said shaft, an advancing pawl responsive to said advancing cam and cooperating with said toothed elements to advance said record medium holding means, an integral holding pawl normally engaging said toothed elements, said holding pawl when disengaged also disengaging said advancing pawl, means responsive to the position of said record medium holding means for disengaging said holding pawl, resilient feeler members mounted in said mechanism and normally spaced from said record medium for sensing said record medium perforations at given points in the movement of said medium, integral actuating fingers pivotally mounted in said mechanisms responsive to said sensing cam means and associated with said feeler members to sense perforations in said record medium, and switch means responsive to the movement of individual actuating fingers whose associated feeler members sense a perforation in said record medium.

10. A perforated record reading mechanism comprising a base structure, record moving means including toothed surfaces for slidable movement along an axis on said base structure, an actuating shaft having an axis normal to said first-mentioned axis, means for repeatedly turning said actuating shaft from a start position, stepping pawl means responsive to motion of said actuating shaft for advancing said record moving means by said toothed surfaces, holding pawl means for holding said record moving means by said toothed surfaces after each advance, said stepping pawl means being disengaged in response to disengagement of said holding pawl means, and means responsive to motion of said actuating shaft for sensing at a sensing position in timed relation to the operation of said stepping pawl means.

11. A perforated record reading mechanism comprising a base structure, means for slidably moving a perforated record along an axis on said base structure, said means for moving including a plurality of teeth parallel to the first-mentioned axis, an actuating shaft having an axis normal to said first-mentioned axis, means for repeatedly turning said actuating shaft in incremental rotary movements of predetermined amplitude from a start position, cam control means mounted on said actuating shaft, stepping pawl means responsive to said cam control means for advancing said means for moving by said teeth, holding pawl means normally engaging said teeth, said holding pawl means including means cooperatng with said stepping pawl means to disengage said stepping pawl means from said teeth when said holding pawl means is disengaged, means responsive to the position of said means for moving for disengaging said holding pawl means from said teeth, and means responsive to said cam control means for sensing at a sensing position in timed relation to the operation of said stepping pawl means.

12. A card reader mechanism comprising a drive member, means for providing said drive member with repeated angular movements, card holding means, means responsive to said angular movements for advancing said card holding means incrementally from a start position, means responsive to said angular movements for sensing a card in synchronism with the operation of said advancing means, means responsive to the position of said card holding means for removing a card from said card holding means, and means responsive to the position of said card holding means for returning said card holding means to its start position.

No references cited.